(12) United States Patent
Rose

(10) Patent No.: US 7,273,122 B2
(45) Date of Patent: Sep. 25, 2007

(54) HYBRID HYDRAULIC DRIVE SYSTEM WITH ENGINE INTEGRATED HYDRAULIC MACHINE

(75) Inventor: Kenric B. Rose, Howell, MI (US)

(73) Assignee: Bosch Rexroth Corporation, Hoffman Estates, IL (US)

( * ) Notice: Subject to any disclaimer, the term of this patent is extended or adjusted under 35 U.S.C. 154(b) by 93 days.

(21) Appl. No.: 10/953,182

(22) Filed: Sep. 30, 2004

(65) Prior Publication Data

US 2006/0068970 A1    Mar. 30, 2006

(51) Int. Cl.
*B60K 6/12*    (2006.01)

(52) U.S. Cl. ........................... 180/165; 180/305

(58) Field of Classification Search ............... 180/165, 180/305, 306, 307; 60/418; 477/2
See application file for complete search history.

(56) References Cited

U.S. PATENT DOCUMENTS

| | | | |
|---|---|---|---|
| 3,892,283 A | | 7/1975 | Johnson |
| 4,098,144 A | | 7/1978 | Besel et al. |
| 4,132,283 A | | 1/1979 | McCurry |
| 4,227,587 A | * | 10/1980 | Carman .................... 180/165 |
| 4,351,409 A | * | 9/1982 | Malik ........................ 180/165 |
| 4,387,783 A | | 6/1983 | Carman |
| 4,592,454 A | | 6/1986 | Michel |
| 4,741,410 A | * | 5/1988 | Tunmore .................... 180/165 |
| 4,986,383 A | | 1/1991 | Evans |
| 5,024,489 A | * | 6/1991 | Tanaka et al. ................. 303/3 |
| 5,088,041 A | | 2/1992 | Tanaka et al. |
| 5,495,912 A | * | 3/1996 | Gray et al. .................. 180/165 |
| 5,505,527 A | * | 4/1996 | Gray et al. .................... 303/3 |
| 5,545,928 A | | 8/1996 | Kotani |
| 5,794,734 A | * | 8/1998 | Fahl et al. .................. 180/165 |
| 6,109,384 A | * | 8/2000 | Bromley et al. ............. 180/242 |
| 6,170,587 B1 | | 1/2001 | Bullock |

(Continued)

FOREIGN PATENT DOCUMENTS

DE    27 35 423 A1    2/1978

(Continued)

OTHER PUBLICATIONS

Hewko, L. O. et al: "Hydraulic Energy Storage Based Hybrid Propulsion System For a Terrestrial Vehicle" Conference Proceedings, vol. 4., Aug. 12, 1990, pp. 99-105 XP010301251 Reno/New York, the whole document.

*Primary Examiner*—Christopher Bottorff
(74) *Attorney, Agent, or Firm*—Berenato, White & Stavish

(57) ABSTRACT

A hybrid hydraulic drive system for a vehicle comprises a prime mover, a transmission connecting the prime mover to drive wheels, a fluid energy storage accumulator, and a reversible hydraulic machine in fluid communication with the energy storage accumulator and drivingly coupled to the prime mover upstream of the transmission. The hybrid hydraulic drive system is arranged such that in a retarding mode the reversible hydraulic machine retards the drive wheels of the vehicle by pumping fluid into the accumulator. In a driving mode the reversible hydraulic machine supplies a supplementary power to the drive wheels of the vehicle using the pressurized fluid from the accumulator to assist propulsion of the vehicle. In a neutral mode the reversible hydraulic machine is disconnected from the prime mover to render the reversible hydraulic machine substantially inoperative to exert any significant driving or retarding influence on the drive wheels.

18 Claims, 3 Drawing Sheets

U.S. PATENT DOCUMENTS

| | | |
|---|---|---|
| 6,202,783 B1 * | 3/2001 | Taylor et al. ............... 180/305 |
| 6,454,033 B1 | 9/2002 | Nathan et al. |
| 6,655,485 B1 | 12/2003 | Ito et al. |
| 6,668,953 B1 | 12/2003 | Reik et al. |
| 6,712,166 B2 | 3/2004 | Rush et al. |
| 6,719,080 B1 | 4/2004 | Gray, Jr. |
| 6,746,366 B2 | 6/2004 | Tamor |
| 6,758,266 B1 * | 7/2004 | Sjunnesson ............... 165/299 |
| 6,971,232 B2 * | 12/2005 | Singh ........................ 60/414 |
| 2002/0074175 A1 | 6/2002 | Bloxham |

FOREIGN PATENT DOCUMENTS

| | | |
|---|---|---|
| DE | 43 33 564 A1 | 6/1995 |
| EP | 0 718 138 A1 | 6/1996 |
| EP | 0 762 957 | 3/1997 |
| EP | 1 008 483 A2 | 6/2000 |
| EP | 199 55 312 A1 | 6/2001 |
| EP | 1 131 221 A0 | 9/2001 |
| GB | 2 065 836 A | 7/1981 |

* cited by examiner

HYBRID HYDRAULIC DRIVE SYSTEM WITH ENGINE INTEGRATED HYDRAULIC MACHINE

BACKGROUND OF THE INVENTION

1. Field of the Invention

The present invention relates to hybrid hydraulic drive systems in general and, more particularly, to a hydraulic drive system of a motor vehicle generating and accumulating propulsion energy by retardation of movement, including an integrated hydraulic machine operatively coupled to a prime mover upstream of a vehicular transmission

2. Description of the Prior Art

Hybrid hydraulic (or regenerative) drive systems are known and have been applied to motor vehicles, especially trucks and buses. Such systems harness energy by retarding the vehicle under braking conditions and accumulating that energy for later use to propel the vehicle. More specifically, typical hybrid hydraulic drive systems utilize a hydraulic machine in the form of an integrated hydraulic pump/motor unit to absorb and add power to a conventional vehicle drive system. While the system is absorbing power the hydraulic pump/motor unit is used to pump hydraulic fluid from a low-pressure vessel or reservoir into a hydraulic energy storage system. This energy storage system typically consists of one or more nitrogen charged hydraulic accumulators. In many cases the functionality also exists to absorb power and reject it into the atmosphere as waste heat energy rather than capturing it. When the hybrid hydraulic system is adding power to a driveline of the vehicle drive system, the hydraulic pump/motor unit is acting as a motor, utilizing the hydraulic energy stored in the accumulator(s).

The current systems have however lacked flexibility in their operation, as they principally have been arranged to dump accumulated energy all at once, for example when a vehicle is accelerating from a standing start, while those systems that have allowed for more controlled release of stored energy, have not done so to optimum efficiency. The use of the energy in the known systems is therefore somewhat inefficient and the known systems therefore have not met with widespread use. Additionally, known systems are time consuming and labor intensive to install.

The motor/pump units in the current hybrid hydraulic drive systems are coupled to the driveline of the vehicle drive system downstream of a vehicular transmission. In other words, the driveline integrated integrated pump/motor absorbs and adds hydraulic power after the vehicular transmission. Due to the reduction gear ratio of the vehicular transmission and the inherent frictional and other power losses in the transmission, the motor/pump unit of the current hybrid hydraulic drive systems should generate substantial amount of the pressurized hydraulic fluid. Single speed driveline integrated systems are limited in their maximum power contribution by the speed of the driveline. Typically when the vehicle speed is low, the driveline speeds are low, this results in low power availability to the driveline. The only way to compensate for the lower driveline speeds is to use a larger displacement pump/motor unit. The larger pump/motor unit allows for a higher torque to be applied to the driveline. For a single speed driveline integrated design, the power availability differential can only be partially mitigated through the use of a larger pump/motor. At some point, depending on the particular application, it becomes unreasonable to increase the size of the pump/motor. Another important factor is that in most cases the higher the pump/motor displacement, the lower the maximum permissible operating speed. This lower maximum operating speed often reduces the operation range of the entire hybrid hydraulic system and thus reduces system effectiveness.

In most cases, multi-speed driveline integrated designs help to reduce the limitations indicated above. However, the additional cost, complexity and weight of such multi-speed designs detract from the feasibility of multi-speed designs. Ultimately the functionality of such multi-speed interface systems duplicates the functionality of the vehicle transmission and is therefore redundant.

Therefore, he motor/pump unit of the current driveline integrated hybrid hydraulic drive systems are relatively large in size, heavy and bulky.

Moreover, the hydraulic pump/motor units integrated into the driveline require a structure to support the weight and reaction torque of the pump/motor. In many cases the pump/motor units may interface into the driveline through a gearbox. In these cases the mounting system would need to support not only the pump/motor unit, but also the gearbox. This required structure will often present a challenge in and of itself to design, and fit into the vehicle chassis. An in depth analysis of the chassis dynamics, weight distribution, noise, harshness, vibration, and critical operational clearances would be required before any such structure could be designed.

Furthermore, in some vehicles equipped with all-wheel drive, where the power delivered to the driveline from the transmission is split via a transfer case between the front and rear axles via a differential gear set, there may also be torque management issues to address. When power is added to one side of the driveline, the possibility exists for serious torque management issues that could cause loss of vehicle control.

Accordingly, it is the intent of this invention to overcome these shortcomings of the prior art, and more specifically, to overcome specific packaging and performance limitations of a driveline mounted regenerative drive system.

SUMMARY OF THE INVENTION

A hybrid hydraulic drive system for a motor vehicle in accordance with the preferred embodiment of the present invention comprises a prime mover, a transmission connecting the prime mover to drive wheels, at least one fluid energy storage accumulator operable to store and release a pressurized fluid, and a reversible hydraulic machine drivingly coupled to the prime mover upstream of the transmission. The reversible hydraulic machine is in fluid communication with the energy storage accumulator.

The hybrid hydraulic drive system is operable in three modes of operation including a driving mode, a retarding mode and a neutral mode. The hybrid hydraulic drive system is arranged such that in the retarding mode the reversible hydraulic machine retards the drive wheels of the vehicle by pumping fluid into the at least one energy storage accumulator. In the driving mode the reversible hydraulic machine supplies a supplementary power to the drive wheels of the vehicle using the pressurized fluid from the at least one energy storage accumulator to assist propulsion of the vehicle. In the neutral mode the coupling device disconnects the reversible hydraulic machine from the prime mover to render the reversible hydraulic machine substantially inoperative to exert any significant driving or retarding influence on the drive wheels. Therefore, the hybrid hydraulic drive system is adapted to supply the supplementary regenerative power and retardation to the drive wheels substantially independently of the prime mover.

Preferably, the reversible hydraulic machine is in the form of an engine integrated hydraulic pump/motor unit that functions both as the hydraulic pump and a hydraulic motor when reversed, such as a high-pressure variable-displacement axial piston hydraulic motor/pump.

The hybrid hydraulic drive system in accordance with the present invention provides a number of advantages over the current hydraulic regenerative drive systems of equivalent performance levels, such as size and weight reduction, lower cost, allows for operation over a wider vehicle operating speed range, allows for some hydraulic pump/motor functionalities even with the stationary vehicle, better adaptability for the existing vehicular chassis, etc.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
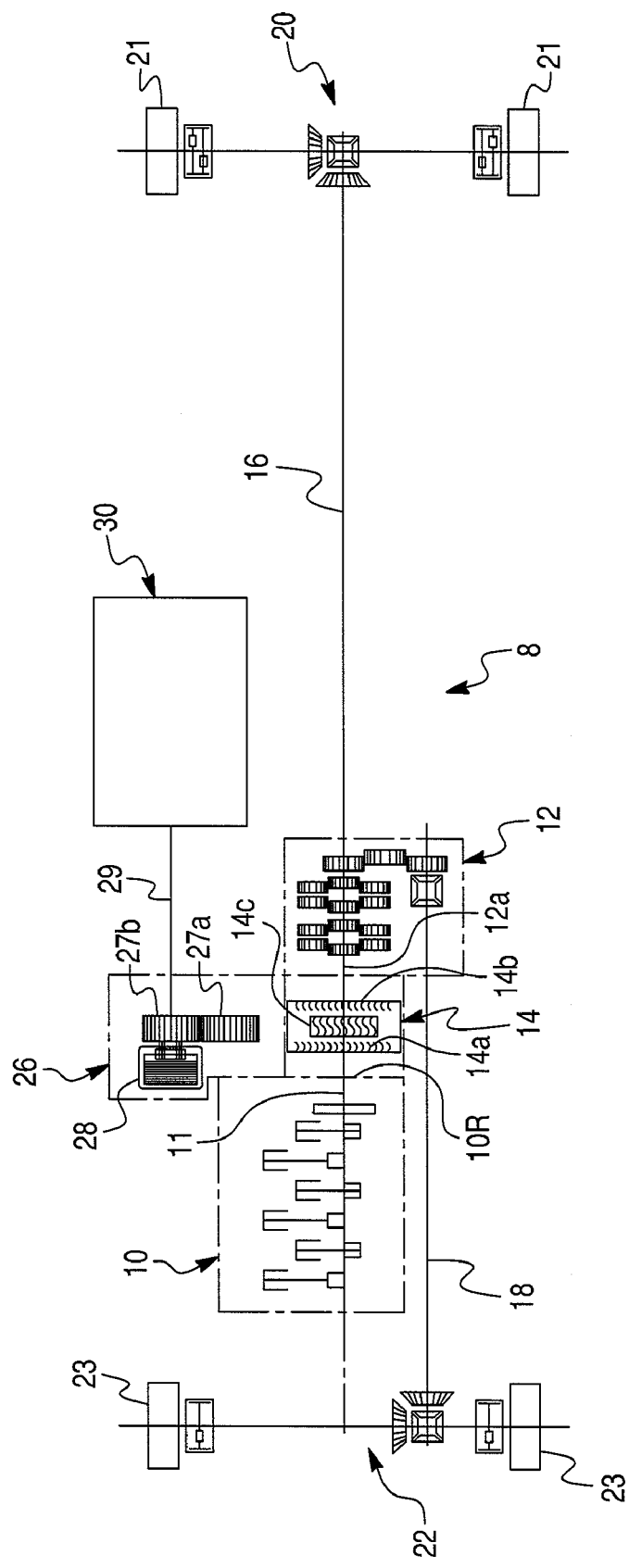
FIG. 1 is a schematic view of a hybrid hydraulic drive systems in accordance with a first embodiment of the present invention.

FIG. 1 schematically depicts a hybrid hydraulic (or regenerative) drive system 8 in accordance with a first embodiment of the present invention for application in motor vehicles, especially heavy land vehicles, such as trucks and buses. The hybrid drive system 8 comprises a prime mover 10, such as an internal combustion engine or electric motor, and a vehicular multi-speed transmission 12. Preferably, the transmission 12 is a planetary automatic transmission including a hydrodynamic torque converter 14 that drivingly couples the prime mover 10 to the transmission 12. It will be appreciated that any appropriate type of vehicular transmission is within the scope of the present invention. In turn, the torque converter 14 includes a turbine 14a (or pump) non-rotatably coupled to an output shaft 11 of the prime mover 10, an impeller 14b non-rotatably coupled to an input shaft 12a of the transmission 12, and a stator 14c. Preferably, as illustrated in FIG. 1, the prime mover 10 is an internal combustion engine and the output shaft 11 is a crankshaft of the engine 10.

The vehicular transmission 12 is drivingly connected to a driveline of the vehicle drive system 8 including a rear drive shaft 16 and a front drive shaft 18. More specifically, the rear drive shaft 16 of the vehicular driveline drivingly couples the transmission 12 to rear drive wheels 21 of a rear drive axle assembly 20, while the front drive shaft 18 drivingly couples the transmission 12 to front drive wheels 23 of a front drive axle assembly 22. It will be appreciated that the hybrid drive system 8 may have only one drive axle assembly, either front or rear.

The hybrid drive system 8 further comprises a hydraulic power system 30. The hydraulic power system 30 in accordance with the preferred embodiment of the present invention includes an engine integrated reversible hydraulic machine 32, a remote low-pressure vessel or hydraulic fluid reservoir 34 fluidly connected to the reversible hydraulic machine 32, and at least one high-pressure hydraulic accumulator 36 fluidly connected to the hydraulic machine 32. The hydraulic fluid reservoir 34 is provided for storing an appropriate amount of a hydraulic fluid and supplying the hydraulic fluid to the hydraulic machine 32. Thus, the hydraulic fluid reservoir 34 is in fluid communication with an inlet of the hydraulic machine 32. The hydraulic fluid reservoir 34 may be provided with a temperature sensor 62, a low level switch 64, and a reservoir pressure switch 66.

Preferably, the engine integrated reversible hydraulic machine 32 is in the form of an integrated hydraulic pump/motor unit that functions both as a hydraulic pump and a hydraulic motor when reversed. More preferably, the integrated hydraulic pump/motor unit 32 is a positive displacement, reversible, high-pressure piston motor/pump. Further preferably, the integrated hydraulic pump/motor unit 32 is a variable-displacement motor/pump, e.g. a high-pressure variable-displacement axial piston hydraulic motor/pump. With this arrangement, the displacement of the integrated hydraulic pump/motor unit 32 may be varied and thus the pressurized hydraulic fluid flow produced can be controlled independent of speed at which it is driven. It will be appreciated, however, that any appropriate hydraulic motor/pump unit is within the scope of the present invention.

The engine integrated hydraulic pump/motor unit 32 of the present invention is drivingly connected to the crankshaft 11 of the engine 10 upstream of the transmission 12.

The interface between the hydraulic pump/motor unit 32 and the crankshaft 11 of the engine 10 may take many forms. More specifically, according to the first exemplary embodiment of the present invention illustrated in FIG. 1, the integrated hydraulic pump/motor unit 32 is drivingly connected to crankshaft 11 at a rear end $10_R$ of the engine 10 before the transmission through a coupling device 26 provided for selectively coupling the reversible hydraulic pump/motor unit 32 to the crankshaft 11 of the engine 10.

The coupling device 26 includes a transfer gearbox in the form of a drive gear 27a and a driven gear 27b, and a clutch assembly 28 provided for selectively coupling/decoupling the pump/motor unit 32 to/from the coupling device 26. The coupling device 26 is drivingly connected to the pump/motor unit 32 via an interface shaft 29. The transfer gearbox is provided for a speed multiplication or reduction ratio between the pump/motor unit 32 and the crankshaft 11. The effective transmission ratio of the transfer gearbox is designed to provide optimum pumping efficiency over a predetermined drive cycle corresponding to the intended vehicular application. Alternatively, the transfer gearbox may include a set of gears providing any desirable gear ration between the pump/motor unit 32 and the crankshaft 11. Further alternatively, the transfer gearbox may include a chain or belt member to physically connect the crankshaft 11 of the engine 10 to the interface shaft 29 of the pump/motor unit 32. Optionally, the transfer gearbox may be in the form of a multiple speed ratio gearbox.

In the first exemplary embodiment of the present invention, the drive gear 27a of the coupling device 26 is drivingly connected to the turbine 14a of the torque converter 14, as shown in FIG. 1. Alternatively, the coupling device 26 may be drivingly connected to an engine driven power-take-off (PTO), typically positioned forward on a transmission case of the vehicular transmission. Such an arrangement is called in the art a "live" PTO in that it is directly connected to the engine and power can be taken (or given) to the engine through it regardless of transmission operation. Further alternatively, the coupling device 26 may be drivingly connected to the crankshaft 11 of the engine 10 through an appropriate PTO adapter. It will be appreciated that the coupling device 26 may be drivingly connected to the crankshaft 11 of the engine 10 by any appropriate manner.

The clutch assembly 28 of the exemplary embodiment of FIG. 1 is provided for selectively coupling/decoupling the interface shaft 29 of the pump/motor unit 32 to/from the driven gear 27b.

Figure 2:
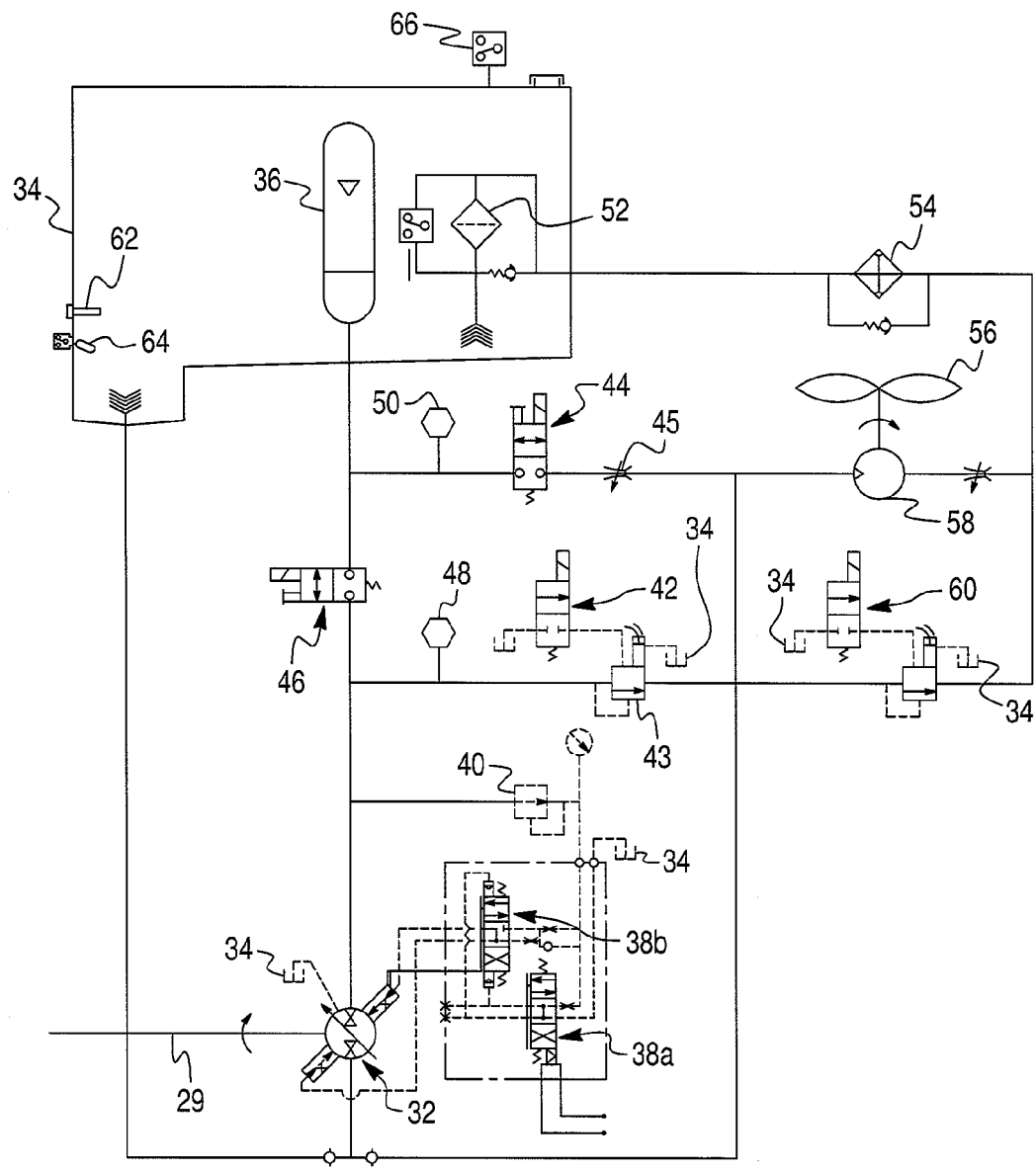
FIG. 2 is a schematic view of a hydraulic drive assembly in accordance with the present invention.

The exemplary embodiment of the hydraulic power system 30 is illustrated in FIG. 2. The hydraulic power system 30 in accordance with the preferred embodiment of the present invention further includes a bank of a plurality of the high-pressure hydraulic accumulators 36 each hydraulically connected to the hydraulic machine 32. Further preferably, the accumulator bank includes nitrogen charged hydraulic accumulators. It will be appreciated that ant other types of the hydraulic accumulators may be employed.

Each of the nitrogen charged hydraulic accumulators 36 preferably includes a housing, preferably cylindrical, which is closed at either end in a sealed manner and which includes a movable diaphragm within the housing that separates the housing interior into first and second chambers (not shown). The first chamber carries a charge of compressible nitrogen gas, while the second chamber is arranged by suitable valve means to receive and release therefrom, a substantially incompressible hydraulic fluid, such as oil. The accumulators 11 accumulate energy by increasing the amount of oil stored within the second chamber so that the movable piston is caused to move to reduce the volume of the first chamber and so compress the gas stored therewithin. The fluid is pumped into the second chamber of the accumulator 11 by the pump/motor unit 32 when the vehicle operates in retarding mode. Conversely, in a driving mode, when the hydraulic fluid is released from the second chamber by the force of the compressed nitrogen gas pushing the diaphragm to reduce the volume of the second chamber, the fluid drives the pump/motor unit 32 so that it acts as a motor to drive the crankshaft 11 of the engine 12, so supplying a supplementary power to the drive wheels, thus assisting propulsion of the vehicle.

The hydraulic power system 30 in accordance with the preferred embodiment of the present invention further includes solenoid valves 38a and 38b, a pressure regulators 40 and 43, a system control valve 42, an accumulator dump valve 44, an accumulator isolation valve 46, a system pressure sensor 48 and an accumulator pressure sensor 50. The solenoid valves 38a and 38b are part of the integrated pump/motor unit 32 and are used to control the volumetric displacement of the pump/motor unit 32. The accumulator dump valve 44 is a solenoid operated 2-way directional valve. Its functionality is to dump the accumulator pressure in a controlled manner thru an adjacent restrictor valve 45. In use, this valve would relive any accumulator pressure when the vehicle is shut down or in the event of a system malfunction. The accumulator isolation valve 46 is a solenoid-operated valve that provides for positive hydraulic isolation of the accumulator 36. The solenoid-operated valves of the hydraulic power system 30 are controlled by an electronic control unit (ECU) (not shown).

Furthermore, the hydraulic power system 30 includes a particulate filter 52, a heat exchanger 54 and a cooling fan 56 associated with the heat exchanger 54 for forced cooling of the hydraulic fluid flowing through the heat exchanger 54. The cooling fan 56 is selectively driven by a hydraulic motor 58, which, in turn, is selectively operated by a fan bypass control valve 60, which effectively controls a bypass hydraulic line of the hydraulic fan motor 58. Preferably, the fan bypass control valve 60 is in the form of a variable, ECU operated relief valve with external vent and drain ports. The fan bypass control valve 60 is arranged in parallel with the cooling fan hydraulic motor 58 for selectively regulating the pressure of the hydraulic fluid supplied to the hydraulic motor 58. One of ordinary skill in the art would appreciate that any other appropriate power source, besides the hydraulic motor, such as an electric motor, may be employed to drive the cooling fan 56.

The hybrid hydraulic (or regenerative) drive system 8 is operable in three modes of operation including a retarding mode, a driving mode and a neutral mode.

In the retarding mode, as an external source of the kinetic energy drives the pump/motor unit 32 through the crankshaft 11 of the engine 12 and the coupling device 26 with the clutch assembly 28 engaged, the pump/motor unit 32 functions as a hydraulic pump. Consequently, the pump/motor unit 32 draws the hydraulic fluid from the hydraulic fluid reservoir 34 and generates a pressurized hydraulic fluid supplied to the storage accumulators 38. The load required to drive the pump 32 creates a retardation force on the crankshaft 11 of the engine 12. Thus, in the retarding the pump/motor unit 32 retards the drive wheels 21 and 23 of the motor vehicle by pumping hydraulic fluid into the energy storage accumulators 38.

In the driving mode, the pressurized hydraulic fluid is released from the energy storage accumulators 38 to drive the pump/motor unit 32. In this mode, the pump/motor unit 32 acts as a hydraulic motor and generates torque rotating the interface shaft 29. The interface shaft 29, in turn, drives the crankshaft 11 of the engine 12 trough the coupling device 26 with the clutch assembly 28 engaged, so supplying a supplementary power to the drive wheels, thus assisting propulsion of the vehicle using hydraulic energy of the pressurized hydraulic fluid from the energy storage accumulators 38.

In the neutral mode, the clutch 28 of the coupling device 26 disconnects the pump/motor unit 32 from the crankshaft 11 of the engine 12 to render the pump/motor unit 32 substantially inoperative to exert any significant driving or retarding influence on the drive wheels 21 and 23 of the motor vehicle.

Therefore, the hybrid hydraulic drive system 8 is adapted to supply the supplementary regenerative power and retardation to the drive wheels 21 and 23 substantially independently of the prime mover 10.

Figure 3:
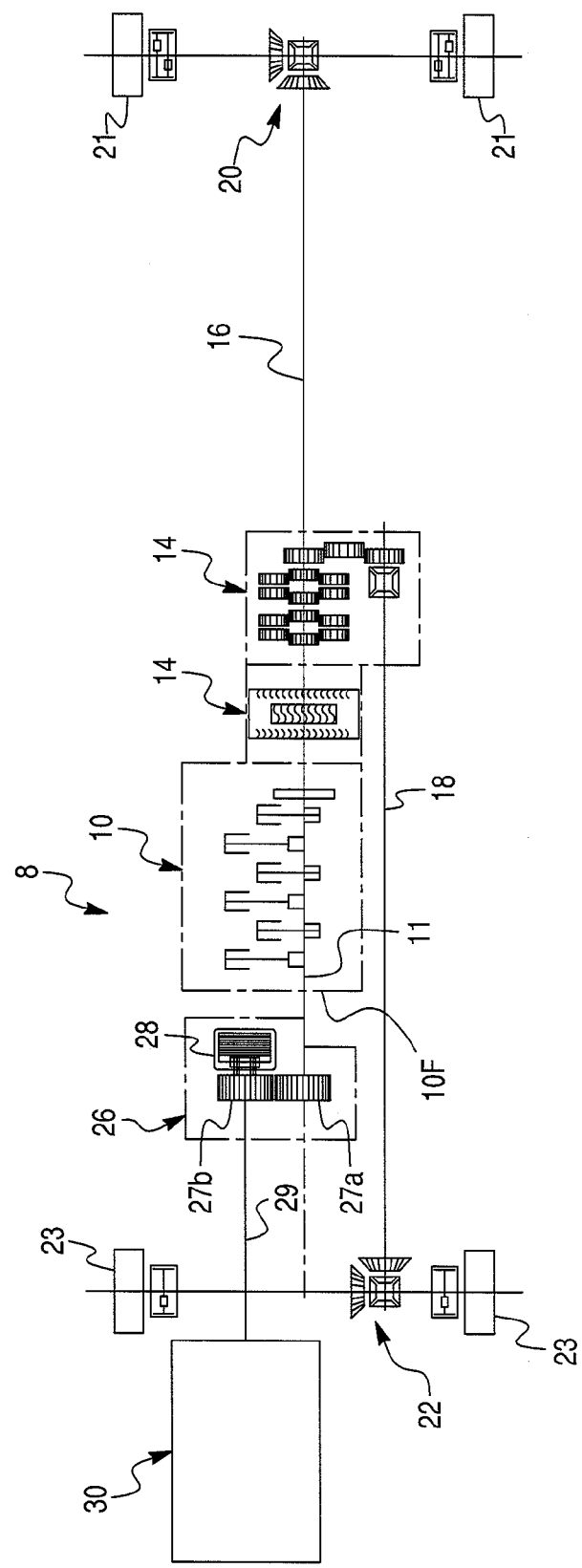
FIG. 3 is a schematic view of the hybrid hydraulic drive systems in accordance with a second embodiment of the present invention.

FIG. 3 of the drawings depicts a second exemplary embodiment of the hybrid hydraulic drive system of the present invention generally depicted with the reference numeral 108. Components, which are unchanged from, or function in the same way as in the first exemplary embodiment depicted in FIGS. 1 and 2 are labeled with the same reference numerals, sometimes without describing detail since similarities between the corresponding parts in the two embodiments will be readily perceived by the reader.

The hybrid hydraulic drive system 108 of the second exemplary embodiment of the present invention and the hybrid hydraulic drive system 8 of the first exemplary embodiment are substantially similar and differ by the location of the coupling device 26 relative to the prime mover 10. More specifically, according to the second exemplary embodiment of the present invention illustrated in FIG. 3, the integrated hydraulic pump/motor unit 32 is drivingly connected to crankshaft 11 at a front end $10_F$ of the engine 10 before the transmission through the coupling device 26 provided for selectively coupling the reversible hydraulic pump/motor unit 32 to the crankshaft 11 of the engine 10. The operation of the hybrid hydraulic drive system 108 of the second exemplary embodiment of the present invention is substantially identical to the operation of the hybrid hydraulic drive system 8 of the first exemplary embodiment.

Therefore, the present invention embodies a novel arrangement of the hybrid hydraulic (or regenerative) drive system comprising a prime mover, a transmission connecting the prime mover to drive wheels, at least one hydraulic fluid energy storage accumulator operable to store and release a pressurized hydraulic fluid, and a reversible hydraulic machine in fluid communication with the energy storage accumulator and drivingly coupled to the prime mover upstream of the transmission. The hybrid hydraulic drive system in accordance with the present invention provides a number of advantages over the current hydraulic regenerative drive systems.

First, to achieve equivalent performance levels (both in terms of power contribution and reduced levels of fuel consumption) the required size of the hydraulic pump/motor unit integrated with the vehicle engine is generally much smaller that required for a driveline integrated designs. In some case the required pump/motor unit size of the engine integrated pump/motor unit is less than half than that required by the single speed driveline integrated systems. In most cases the engine integrated hydraulic pump/motor unit spends a significant portion of its time running at higher operational speeds than that of the driveline integrated systems, thus taking advantage of the full working ratio range of the transmission and torque converter. These higher operational speeds allow for greater immediate hybrid power availability to the vehicle.

Along with the reduction in the required displacement of t the engine integrated hydraulic pump/motor unit, comes a reduction in weight.

It can be reasonably expected that the smaller (in terms of physical size and volumetric fluid displacement) hydraulic pump/motor unit required in the hybrid system integrated with the vehicle engine would be less expensive and easier to procure than the larger pump/motor required in hybrid hydraulic system integrated into the vehicle driveline.

Interfacing the hydraulic pump/motor unit at the engine allows the existing vehicle driveline to remain unaltered. In many vehicles it is either impossible, or highly undesirable to alter the original driveline. For example there may be physical clearance, length, harmonics, or angularity issues that would prevent the installation of a hybrid hydraulic pump/motor into the driveline.

Furthermore, interfacing the hydraulic pump/motor unit with the prime mover allows for operation of the hybrid hydraulic drive system over a wider vehicle operating speed range than the driveline integrated hybrid system. Two factors contribute to this increased functionality over the driveline integrated design:

the smaller hydraulic hybrid pump/motor unit generally allows for a higher maximum operating speed;

the operation of the hydraulic pump/motor unit through the gear ratio range of the transmission keeps the pump/motor ratio locked to the maximum operation speed of the engine. On many vehicles this maximum engine operational speed is lower than the equivalent driveline speed due to the usage of one or more transmission overdrive ratios.

In those circumstances where the engine integrated hybrid hydraulic system is operational over a wider vehicle operational speed range, the resulting greater utilization of the hybrid system generally results in an increased hybrid system performance realization.

Moreover, one of the most basic functional differences in the hydraulic hybrid drive system of the present invention integrated at the engine of the vehicle, as opposed to the conventional hydraulic hybrid drive system integrated into the drive train, is the functional availability of the hydraulic pump/motor unit with the vehicle in a stationary condition. The driveline integrated hydraulic pump/motor unit is completely non-functional when the vehicle is stationary, whereas the engine integrated hydraulic pump/motor unit allows for some hydraulic pump/motor functionalities even with the stationary vehicle:

1. Engine Starting: with the hydraulic pump/motor unit connected to the vehicle engine, there exists the ability to use the pump/motor to start the engine. This is provided of course that sufficient hydraulic energy is stored to rotate the engine. This ability of the hydraulic hybrid drive system of the present invention to start the engine from the pump/motor unit of the hydraulic power system allows the engine to be shut down when appropriate to avoid idling conditions. In many cases, particularly with vehicles equipped with automatic transmissions, it is not possible for a driveline mounted hybrid system to start the engine.

2. Auxiliary Hydraulic Power Availability: the engine driven hydraulic pump/motor unit provides for the possibility of the generating auxiliary hydraulic power. Many vehicles require a source of auxiliary hydraulic power. A few examples of such vehicles are: refuge vehicles, dump bed vehicle, cement transport vehicles, and many more.

3. Pre-charging of energy storage accumulators (preferably, nitrogen charged hydraulic accumulators): the hybrid hydraulic drive system equipped with the engine driven pump/motor unit allows for the accumulators to be pre-charged without actually moving the vehicle. In some hybrid power utilization strategies it would benefit from the ability to pre-charge the accumulators. For example, when the heavy emissions associated with the engine accelerating the vehicle from a stop are of paramount importance, the light parasitic load over a period of time to charge the accumulators would be acceptable in order to ensure that the vehicle would be able to adequately accelerate. Another hybrid power utilization strategy which would benefit from the ability to pre-charge the accumulators would be one in which vehicle acceleration performance would be paramount.

4. System circulation/conditioning: with the engine driven hydraulic pump/motor unit it would be possible to circulate, filter, and cool the hydraulic fluid. Depending on the vehicle duty cycle and the overall hybrid control strategy, the ability to cool the fluid with the stationary vehicle could result in a higher availability of the hybrid system.

5. System pre-heating: in many cases, in extreme cold weather operation, it may be necessary to pre-heat the hydraulic fluid of the system. In the driveline integrated system it would only be possible to pre-heat the system through the use of generated hydraulic waste heat when the vehicle is moving.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A hybrid hydraulic drive system for a motor vehicle, said system operable in three modes of operation including a driving mode, a retarding mode and a neutral mode, said system comprising:
a prime mover and a transmission connecting said prime mover to drive wheels;
at least one fluid energy storage accumulator operable to store and release a pressurized fluid:
a reversible hydraulic machine operatively coupled to an output shaft of said prime mover upstream of the transmission, said reversible hydraulic machine being in fluid communication with said at least one energy storage accumulator; and
said hybrid hydraulic drive system being arranged such that in said retarding mode said reversible hydraulic machine retards the drive wheels of the vehicle by pumping fluid into said at least one energy storage accumulator, in said driving mode said reversible hydraulic machine supplies a supplementary power to the drive wheels of the vehicle using said pressurized fluid from said at least one energy storage accumulator to assist propulsion of said vehicle, and in said neutral mode said reversible hydraulic machine is disconnected from said prime mover to render said reversible hydraulic machine substantially inoperative to exert any significant driving or retarding influence on said drive wheels;
said hybrid hydraulic drive system thereby in use being adapted to supply said supplementary regenerative power and retardation to said drive wheels substantially independently of said prime mover.

2. The hybrid hydraulic drive system as defined in claim 1, further comprising a coupling device for coupling said reversible hydraulic machine to said prime mover.

3. The hybrid hydraulic drive system as defined in claim 2, wherein said coupling device includes a clutch assembly provided for selectively coupling said reversible hydraulic machine to said prime mover.

4. The hybrid hydraulic drive system as defined in claim 3, wherein in said neutral mode said clutch assembly of said coupling device disconnects said reversible hydraulic machine from said prime mover.

5. The hybrid hydraulic drive system as defined in claim 3, wherein said clutch assembly is a friction clutch assembly.

6. The hybrid hydraulic drive system as defined in claim 1, further comprising a hydraulic fluid reservoir provided for storing an appropriate amount of hydraulic fluid, said hydraulic fluid reservoir is in fluid communication with an inlet of said reversible hydraulic machine.

7. The hybrid hydraulic drive system as defined in claim 1, wherein said at least one fluid energy storage accumulator is a hydro-pneumatic accumulator.

8. The hybrid hydraulic drive system as defined in claim 1, wherein said at least one fluid energy storage accumulator includes a plurality of fluid energy storage accumulators.

9. The hybrid hydraulic drive system as defined in claim 1, wherein said reversible hydraulic machine is operatively coupled to said output shaft of said prime mover at a rear end thereof.

10. The hybrid hydraulic drive system as defined in claim 1, wherein said reversible hydraulic machine is operatively coupled to said output shaft of said prime mover at a front end thereof.

11. The hybrid hydraulic drive system as defined in claim 1, further comprising a torque converter disposed between said prime mover and said transmission, said torque converter includes a turbine drivingly connected .to said output shaft of said prime mover, wherein said reversible hydraulic machine is operatively coupled to said turbine of said torque converter.

12. The hybrid hydraulic drive system as defined in claim 6, further comprising a particulate filter for filtering said hydraulic fluid.

13. The hybrid hydraulic drive system as defined in claim 6, further comprising a heat exchanger for cooling said hydraulic fluid.

14. The hybrid hydraulic drive system as defined in claim 13, further including a cooling fan associated with said heat exchanger for forced cooling of said hydraulic fluid flowing through said heat exchanger.

15. The hybrid hydraulic drive system as defined in claim 14, wherein said cooling fan is driven by a hydraulic motor.

16. The hybrid hydraulic drive system as defined in claim 14, wherein said cooling fan is driven by an electric motor.

17. The hybrid hydraulic drive system as defined in claim 1, wherein said reversible hydraulic machine is a reversible hydraulic pump/motor unit capable to function both as a hydraulic pump and a hydraulic motor.

18. The pressurized hydraulic fluid system as defined in claim 17, wherein said hydraulic pump/motor unit includes a variable-displacement axial piston hydraulic motor/pump.

* * * * *